(12) United States Patent
Miyamoto (10) Patent No.: US 8,915,625 B2
(45) Date of Patent: Dec. 23, 2014

(54) LIGHTING DEVICE

(75) Inventor: Itsuhiro Miyamoto, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 13/517,211

(22) PCT Filed: Dec. 14, 2010

(86) PCT No.: PCT/JP2010/072428
§ 371 (c)(1),
(2), (4) Date: Jun. 19, 2012

(87) PCT Pub. No.: WO2011/077998
PCT Pub. Date: Jun. 30, 2011

(65) Prior Publication Data
US 2012/0257399 A1    Oct. 11, 2012

(30) Foreign Application Priority Data

Dec. 25, 2009  (JP) .................................. 2009-293681
Mar. 10, 2010  (JP) .................................. 2010-052605

(51) Int. Cl.
| B60Q 1/06 | (2006.01) |
| F21V 29/00 | (2006.01) |
| G02B 27/01 | (2006.01) |
| G02F 1/1335 | (2006.01) |

(52) U.S. Cl.
CPC .......... *G02B 27/01* (2013.01); *G02F 1/133603* (2013.01); *G02F 1/133608* (2013.01); *G02F 2001/133607* (2013.01); *G02F 2001/133612* (2013.01); *G02F 2001/133628* (2013.01); *G02F 2201/46* (2013.01)
USPC .......................................... 362/373; 362/355

(58) Field of Classification Search
USPC .......... 362/249.02, 257, 294, 311.01, 311.02, 362/373
See application file for complete search history.

(56) References Cited

U.S. PATENT DOCUMENTS

| 5,541,748 | A | * | 7/1996 | Ono et al. ........................ 349/42 |
| 7,478,925 | B2 | * | 1/2009 | Hiyama et al. ............ 362/249.02 |
| 2009/0147181 | A1 | * | 6/2009 | Park et al. ........................ 349/64 |
| 2009/0154169 | A1 | * | 6/2009 | Liu et al. ........................ 362/310 |
| 2011/0128742 | A9 | * | 6/2011 | Yuen et al. ..................... 362/294 |

FOREIGN PATENT DOCUMENTS

| JP | 2000-349307 | | 12/2000 |
| JP | 2000-349307 | A | 12/2000 |
| JP | 2003-347601 | A | 12/2003 |
| JP | 2005-181640 | | 7/2005 |
| JP | 2005-181640 | A | 7/2005 |
| JP | 2009-87716 | | 4/2009 |
| JP | 2009-087716 | | 4/2009 |

OTHER PUBLICATIONS

Japanese Office Action issued in Application No. 2010-052605 dated Nov. 12, 2013.
Japanese Office Action issued in Japanese Application No. 2010-052605 dated Feb. 12, 2014.

* cited by examiner

*Primary Examiner* — Donald Raleigh
(74) *Attorney, Agent, or Firm* — McDermott Will & Emery LLP (57) ABSTRACT

A lighting device that comprises a light source unit, with light sources positioned upon a circuit substrate; an LCD panel illuminated by the light emitted from the light sources; a casing, and a diffusion member installed upon the casing. The circuit substrate is mounted so as to block the lower end aperture of the hollow portion. The diffusion member is mounted so as to block an upper end aperture of the hollow portion, which constitutes the opposite end of the hollow portion from the lower end aperture thereof. Radiation units are formed upon the casing to radiate heat caused by the light sources outside the casing.

4 Claims, 5 Drawing Sheets

LIGHTING DEVICE

RELATED APPLICATIONS

This application is the U.S. National Phase under 35 U.S.C. §371 of International Application No. PCT/JP2010/072428, filed on Dec. 14, 2010, which in turn claims the benefit of Japanese Application Nos. 2009-293681, filed on Dec. 25, 2009 and 2010-052605, filed on Mar. 10, 2010, the disclosures of which Applications are incorporated by reference herein.

TECHNICAL FIELD

The present invention relates to a lighting device configured to light a liquid crystal display panel (lighted member) mounted on a head up display, for example.

BACKGROUND ART

In the related art, as a lighting device of this type, for example, the one described in Patent Document 1 shown below is known. The lighting device described in Patent Document 1 includes a light source unit having a light source (LED) mounted (disposed) on a substrate as a circuit board, a liquid crystal display panel (lighted member) to be lighted by an illuminating light beam from the light source, a case member arranged between the substrate and the liquid crystal display panel and formed of a synthetic resin having a cavity portion provided so as to correspond to the light source, and a diffusing member interposed between the case member and the liquid crystal display panel and placed on the case body.

Then, in this case, the case body are placed on the substrate so as to surround the light source, and the diffusing member and the liquid crystal display panel is arranged on the case body in a stacked manner so that the liquid crystal display panel is positioned at an uppermost position. In other words, it means that the substrate of the light source unit is disposed so as to close an opening on a lower end side of the cavity portion and the diffusing member (the liquid crystal display panel) is disposed so as to close an opening on an upper end side of the cavity portion on the opposite side from the opening on the lower end side.

In this configuration, the illuminating light beam emitted from the light source passes the cavity portion, which corresponds to the inner portion of the case member, is substantially uniformized through the diffusing member placed on the case body, and the uniformized illumination light beam lights through the liquid crystal display panel placed on the diffusing member. Accordingly, the liquid crystal display panel is lighted by a back light.

RELATED ART DOCUMENT

Patent Document

Patent Document 1: JP-A-2005-181640

OUTLINE OF THE INVENTION

Problems to be Solved by the Invention

In the case of the lighting device described in Patent Document 1, the case body is arranged between the diffusing member (liquid crystal display panel) and the substrate, and the cavity portion surrounded by the diffusing member, the substrate, and the case body is formed as a sealed space, and hence there arises a problem in that heat generated when the light source emits a light beam stays in the sealed space. When the heat stays in the closed space, the case body or the like positioned in the periphery of the sealed space may be deformed by going into a high-temperature state, and hence the lowering of the lighting quality of the liquid crystal display panel which is a lighted member may be resulted.

In order to cope with the problem as described above, it is an object of the present invention to provide a lighting device which prevents a case body or the like from deforming due to heat generated when a light source emits a light beam and eliminates a provability of lowering of the lighting quality of a lighted member.

Means for Solving the Problems

A lighting device according to the present invention is a lighting device including: a light source unit having a light source disposed on a substrate; a lighted member arranged on the front side of the light source unit and lighted by an illuminating light beam from the light source; and a case member arranged between the substrate and the lighted member and includes a cavity portion provided so as to correspond to the light source, wherein the substrate is disposed so as to close an opening on a lower end side of the cavity portion and the lighted member is disposed so as to close an opening on an upper end side of the cavity portion on the side opposite from the lower end side opening, and the case member is formed with a heat releasing portion for releasing heat generated by the light source to the outside of the case body.

The present invention is a lighting device including: a light source unit having a light source disposed on a substrate; a lighted member arranged on the front side of the light source unit and lighted by an illuminating light beam from the light source; a case member arranged between the substrate and the lighted member and includes a cavity portion provided so as to correspond to the light source; and a placed member positioned between the case member and the light member and placed on the case body, wherein the substrate is disposed so as to close an opening on a lower end side of the cavity portion and the placed member is disposed so as to close an opening on an upper end side of the cavity portion on the side opposite from the lower end side opening and the case member is formed with a heat releasing portion for releasing heat generated by the light source to the outside of the case body.

The present invention is also characterized in that the heat releasing portion is formed of a notched portion or a through hole portion formed on the case body so as to communicate with the cavity portion.

The present invention is also characterized in that the substrate is provide with a wiring pattern configured to supply lighting power to the light source, and the wiring pattern is provided on the substrate so as to circumvent a portion where the substrate and the case member come into abutment.

Advantage of the Invention

According to the present invention, the initial object can be achieved, and there is provided a lighting device which prevents a case body or the like from deforming due to heat generated when a light source emits a light beam and eliminates provability of lowering of the lighting quality of a lighted member is provided.

MODES FOR CARRYING OUT THE INVENTION

Referring now to FIG. 1 to FIG. 4, an embodiment in which the present invention is applied to a head-up display apparatus for a vehicle will be described.

Figure 1:
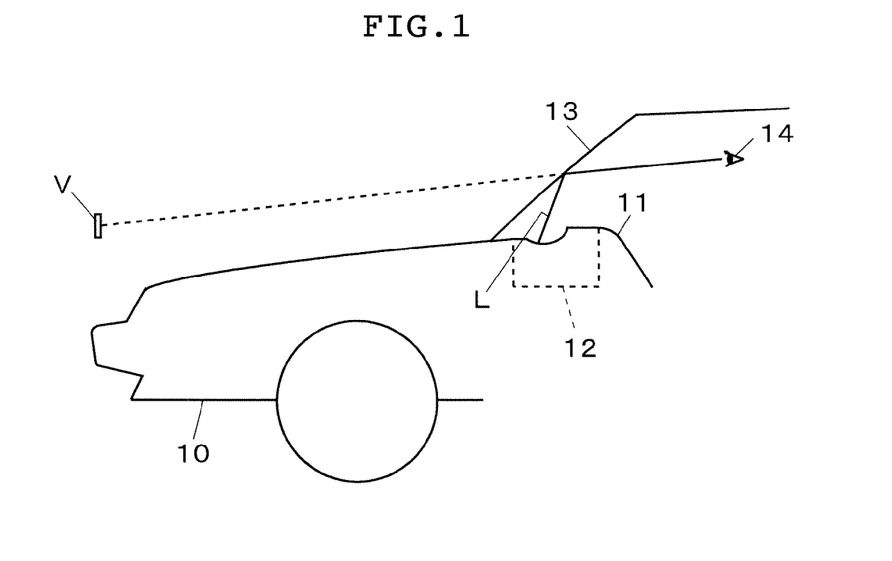
FIG. 1 is a schematic view of a head-up display apparatus according to an embodiment of the present invention.

The head-up display apparatus is an apparatus configured to display a virtual image V by reflecting a display light L which is projected by a display device 12 as a display unit disposed in the interior of an instrument panel 11 of a vehicle 10 toward a driver (user) 14 of the vehicle 10 using a front glass 13 of the vehicle 10, which is a projecting member. In other words, the head-up display apparatus for a vehicle is configured to illuminate (project) a display light beam L emitted from the display described laser of the display device 12 on the front glass 13 (the projecting member described above), and cause the driver 14 to view a virtual image (displayed image) V obtained by this illumination. Accordingly, the driver 14 can observe the virtual image V displayed forward in front of the driver's seat with a scenery superimposed therewith.

Figure 2:
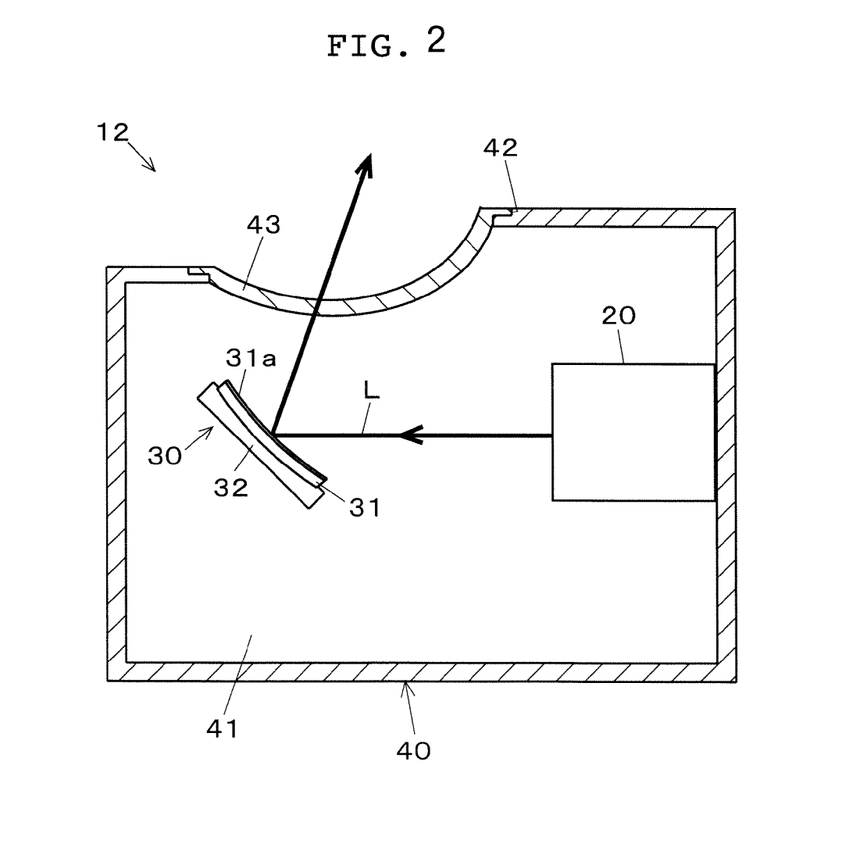
FIG. 2 is a cross-sectional view of the display device according to the same embodiment.

The display apparatus 12 mainly includes a display 20 as a lighting device, a reflector 30, and a housing 40 as shown in FIG. 2.

Figure 3:
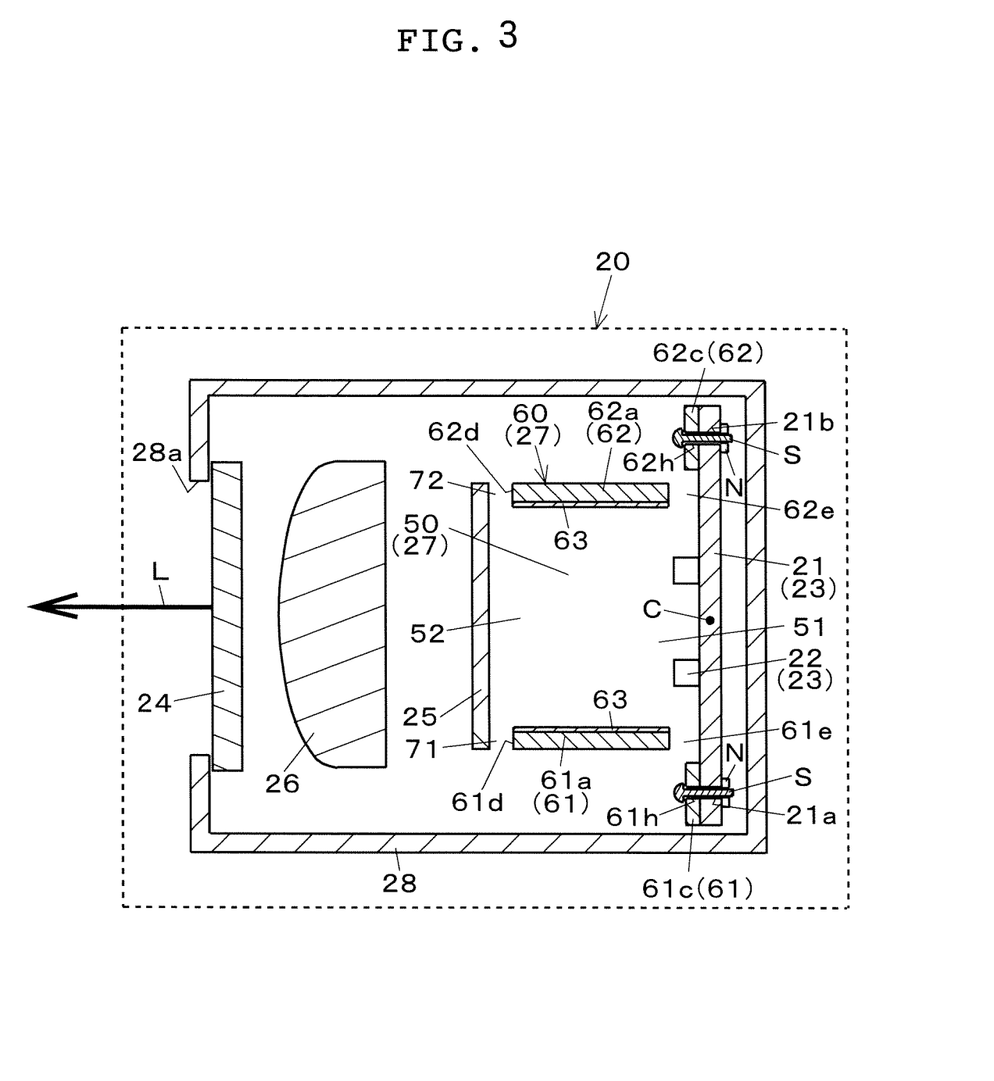
FIG. 3 is a cross-sectional view of the lighting device according to the same embodiment.

As shown in FIG. 3 in detail, the display 20 includes a light source unit 23 having plural (two for example) light sources 22 mounted (disposed) on a circuit board 21 as a substrate, a liquid crystal display panel 24 as a lighted member which is transmitted and lighted by the illuminating light beams from the plural light sources 22 therethrough, a diffusing member 25 arranged between the light source unit 23 and the liquid crystal display panel 24, a lens member 26 positioned between the diffusing member 25 and the liquid crystal display panel 24, a case body 27 arranged between the circuit board 21 and the diffusing member 25 (liquid crystal display panel 24) so as to surround the respective light sources 22, and a housing 28 configured to hold and accommodates these members.

The circuit board 21 is formed of a hard wiring substrate having a predetermined wiring pattern provided thereon, and includes the respective light sources 22 mounted on the wiring pattern. Reference numerals 21a and 21b designate substantially circular-shaped first and second opening holes provided so as to communicate with the first and second screw holes, described later, provided on the case body 27, and the opening holes 21a, 21b are provided on both end sides of the circuit board 21, respectively (see FIG. 4).

The light sources 22 are formed of chip-type light-emitting diodes (LEDs) which emit color as needed, for example, and are light-emitting members which supply illuminating light beams to the diffusing member 25 (the liquid crystal display panel 24).

The liquid crystal display panel 24 is formed of a TFT (thin-film transistor) type liquid crystal display element having polarizing films provided on the front and back surfaces of a liquid crystal cell formed by encapsulating liquid crystal between a pair of translucent substrates, and is arranged on the front side of the light source unit 23 (the lens member 26) so as to form the display light beam L by allowing the illuminating light beams from the respective light sources 22 (in other words, a parallel outgoing light beam emitted from the lens member 26) to pass therethrough.

The liquid crystal display panel 24 as described above is capable of displaying a measured value of the speed of the vehicle 10 or the number of revolutions of the engine as a numerical value using an arithmetic circuit (not shown) configured to measure the vehicle speed or the number of revolutions of the engine on the basis of output signals from a vehicle speed sensor or a engine revolution sensor provided on the vehicle 10.

Displayed information displayed by the liquid crystal display panel 24 is not limited to the vehicle speed or the number of revolutions of the engine, and is arbitrary, and, for example, may be travel distance information, navigation information, or outside temperature information.

The diffusing member 25 is formed of, for example, a translucent synthetic resin having a milky white color, is formed into a substantially flat-panel shape, is positioned between the case body 27 and the lens member 26 (the liquid crystal display panel 24) and, in this case, is placed on the case body 27 so as to close the upper end side opening of a cavity portion, described later, provided in the case body 27. The diffusing member 25 as a placed member described above has a function as a light-diffusing panel for diffusing the illuminating light beams emitted from the respective light sources 22 and proceeding toward the lens member 26 in substantially uniformly.

The lens member 26 is formed of a translucent synthetic resin, is formed of a convex lens having a flat surface on the back side (the diffusing member 25 side) and a convex surface on the front side (the liquid crystal display panel 24 side), and has a function as a light-collecting member configured to collect diffused outgoing light emitted from the diffusing member 25. In other words, the lens member 26 is configured cause the diffused outgoing light to be refracted as required, and parallel outgoing light to be converted into a substantially parallel light flux toward the liquid crystal display panel 24.

The case body 27 is formed of, for example, a synthetic resin, is formed into a substantially frame shape, and includes a cavity portion 50 in which the illuminating light beams from the respective light sources 22 are introduced and a substantially frame shaped body portion 60 provided so as to surround the cavity portion 50.

The cavity portion 50 is provided so as to correspond to the respective light sources 22, and is formed as a lighting space for guiding the illuminating light beams emitted from the respective light sources 22 toward the diffusing member 25 (that is, toward the liquid crystal display panel 24). Then, in this case, the circuit board 21 is disposed so as to close the lower end side opening 51 of the cavity portion 50, and the diffusing member 25 is placed (disposed) on the case body 27 so as to close the upper end side opening 52 of the cavity portion 50 on the side opposite from the lower end side opening 51.

Figure 4:
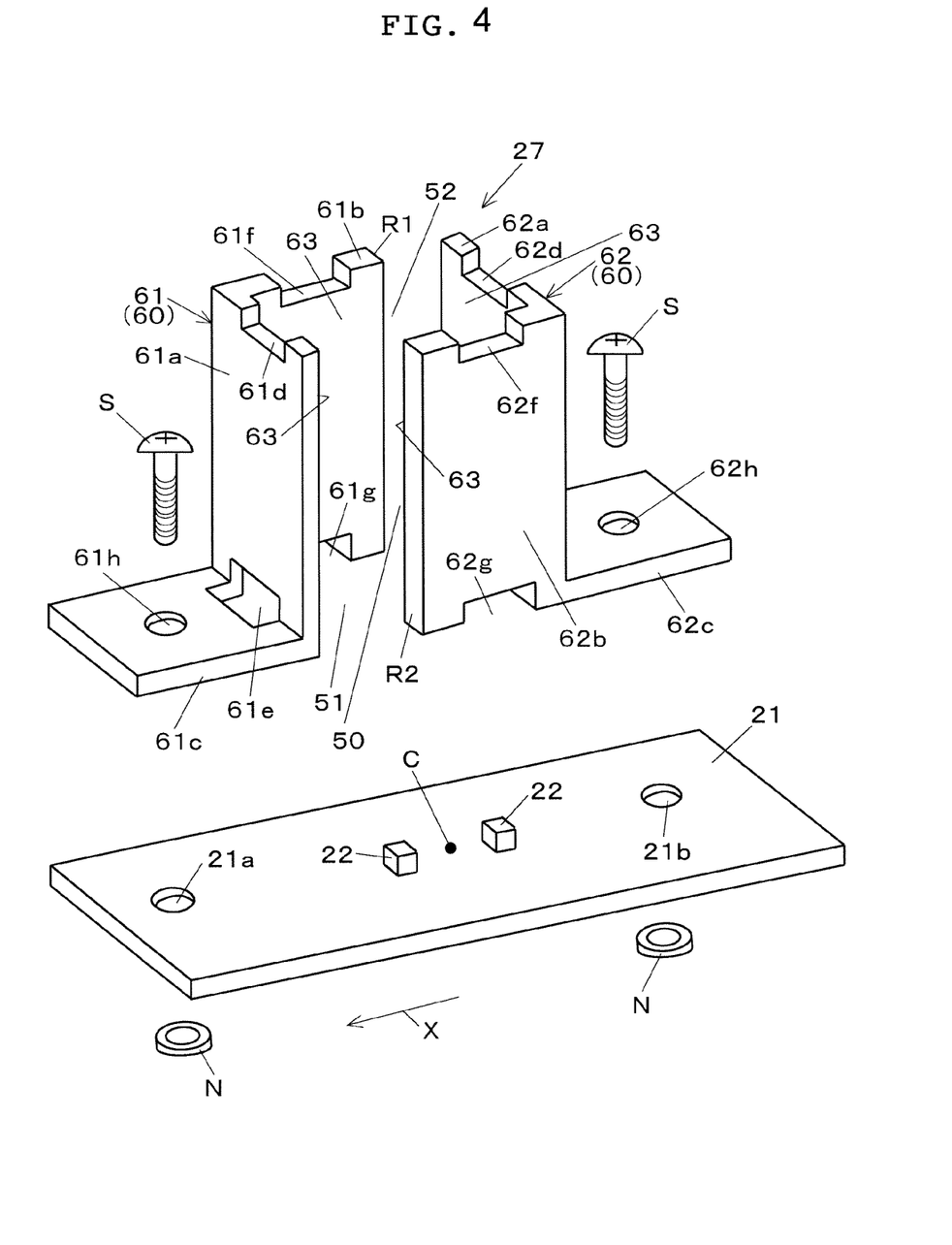
FIG. 4 is a perspective view showing a case body and a substrate according to the same embodiment.

The body portion 60 is configured to be divided into two parts in pair as shown in FIG. 4. More specifically, the body portion 60 is configured to be divided into a first base portion 61 located on the left side in FIG. 4 and a second base portion 62 located on the right side in FIG. 4. In other words, the body portion 60 is configured to be divided so as to have a pair of the base portions 61, 62 via the cavity portion 50.

Also, in this case, the first base portion 61 and the second base portion 62 have, geometrically speaking, a point symmetry with respect to a center point C of the circuit board 21 that is a virtual center point in FIG. 4 (or a center portion of the diffusing member 25 having substantially the same shape obtained by combining the respective base portions 61 and 62, although detail illustration is omitted) when viewing the case body 27 from the liquid crystal display panel 24 side. In other words, when the first base portion 61 is rotated by 180° about the center point C, the first base portion 61 is overlapped completely with the second base portion 62.

The first base portion 61 is configured to include a first opposing wall portion 61a formed of an upright wall portion opposing a third opposing wall portion, described later, of the second base portion 62, a second opposed wall portion 61b formed of an upright wall portion opposing a fourth opposing wall portion, described later, of the second base portion 62 and a flat-panel shaped first flange portion 61c extending in the direction of an arrow X in FIG. 4 so as to be in parallel with the circuit board 21 from the lower end side of the first opposing wall portion 61a formed integrally to each other.

In FIG. 4, the first opposing wall portion 61a is formed with a first notched portion 61d as a heat releasing portion notched so as to form a depression (recessed) shape for releasing heat generated by the respective light sources 22 to the outside of the case body 27 at a center portion on the upper end side thereof and is formed with a first through hole portion 61e at a boundary portion between the first opposing wall portion 61a and the first flange portion 61c.

The first through hole portion 61e described above is formed of an opening window portion formed so as to open by hollowing out a substantially center area of the boundary portion between the first opposing wall portion 61a and the first flange portion 61c, and functions as an outside air introducing portion for introducing air (outside air) existing around the case body 27.

Furthermore, in FIG. 4, the second opposing wall portion 61b is formed with a second notched portion 61f which is notched so as to form a depression (recessed) shape and functions as a heat releasing portion for releasing heat generated by the respective light sources 22 to the outside of the case body 27 at a center portion on the upper end side thereof, and the second opposed wall portion 61b is formed with a third notched portion 61g which is notched so as to form an inverted depression (recessed) shape and functions as an outside air introducing portion for introducing air (outside air) existing around the case body 27 at a center portion on the lower end side thereof.

Also, the inner wall portion (inner wall surface) of the first opposing wall portion 61a which corresponds to the boundary portion between the cavity portion 50 and the first base portion 61 and the inner wall portion (inner wall surface) of the second opposed wall portion 61b which corresponds to the boundary portion between the cavity portion 50 and the first base portion 61 are formed with a mirror layer 63 in a mirror state by aluminum depositing, chrome plating, or the like.

Although detailed illustration is omitted, in FIG. 4, the mirror layer 63 is not formed at a position of the first opposing wall portion 61a opposing the fourth opposing wall portion. The first flange portion 61c is formed with a first screw hole 61h provided so as to communicate with the first opening hole 21a provided on the circuit board 21 and allows penetration of a screw portion of a screw S.

In the same manner, the second base portion 62 includes a third opposing wall portion 62a formed of an upright wall portion opposing the first opposing wall portion 61a, fourth opposed wall portion 62b formed of an upright wall portion opposing a second opposed wall portion 61b, described later, and a flat-panel shaped second flange portion 62c extending in the direction opposite from the arrow X in FIG. 4 so as to be in parallel with the circuit board 21 from the lower end side of the third opposing wall portion 62a formed integrally to each other.

Then, in FIG. 4, the third opposed wall portion 62a is formed with a fourth notched portion 62d notched so as to form a depression (recessed) shape and configured to function as a heat releasing portion for releasing heat generated by the respective light sources 22 to the outside of the case body 27 at a center portion on the upper end side of the third opposed wall portion 62a, and the second through hole portion 62e is formed at a boundary portion between the third opposed wall portion 62a and the second flange portion 62c so as to oppose the first through hole portion 61e (see FIG. 3).

Although detailed illustration is omitted, the second through hole portion 62e as described above has the substantially same shape as the first through hole portion 61e, is formed of an opening window portion formed so as to open by hollowing out the substantially center area of the boundary portion between the third opposed wall portion 62a and the second flange portion 62c, and functions as an outside air introducing portion for introducing the air (outside air) existing around the case body 27.

Furthermore, in FIG. 4, the fourth opposed wall portion 62b is formed with a fifth notched portion 62f notched so as to form a depression (recessed) shape and configured to function as a heat releasing portion for releasing the heat generated by the respective light sources 22 to the outside of the case body 27 at a center portion of the upper end side thereof so as to oppose the second notched portion 61f described above, and the fourth opposed wall portion 62b is formed with a sixth notched portion 62g notched so as to form an inverted depression (recessed) shape for introducing air (outside air) existing around the case body 27 at a center portion of a lower end side thereof so as to oppose the third notched portion 61g.

Also, the inner wall portion (inner wall surface) of the third opposing wall portion 62a which corresponds to the boundary portion between the cavity portion 50 and the second base portion 62 and the inner wall portion (inner wall surface) of the fourth opposed wall portion 62b which corresponds to the boundary portion between the cavity portion 50 and the second base portion 62 are formed with the above-described mirror layer 63 in a mirror state by aluminum depositing, chrome plating, or the like.

Although detailed illustration is omitted, in FIG. 4, the mirror layer 63 is not formed at a position of the third opposing wall portion 62a opposing the second opposing wall portion 61b. Also, the second flange portion 62c is formed with a second screw hole 62h provided so as to communicate with the second opening hole 21b provided on the circuit board 21 and allows penetration of a screw portion of a screw S.

The housing 28 is formed of a synthetic resin material and formed into a substantially box shape, and has a function as a storage member configured to store the light source unit 23, the liquid crystal display panel 24, the diffusing member 25, the lens member 26 and the case body 27, and includes an opening portion 28a for causing a display area (not shown) of the liquid crystal display panel 24 to face therein.

Subsequently, focusing on the circuit board 21 and the case body 27, an assembly example for assembling both members will be described. First of all, the first base portion 61 and the second base portion 62 are positioned so that the inner wall portion of the first opposing wall portion 61a and the inner wall portion of the third opposed wall portion 62a oppose each other, and the inner wall portion of the second opposed wall portion 61b and the inner wall portion of the fourth opposed wall portion 62b oppose each other, respectively.

Subsequently, a double-face tape (not shown) is adhered on a first side surface portion R1 which is a portion of the second opposed wall portion 61b corresponding to the third opposed wall portion 62a and a second side surface portion R2 which is a portion of the fourth opposed wall portion 62b corresponding to the first opposing wall portion 61a.

Then, by moving the second base portion 62 in parallel along the arrow X direction from this state, the first side surface portion R1 is joined to the portion of the third opposed wall portion 62a opposing thereto and, simultaneously, the second side surface portion R2 is joined to the portion of the first opposing wall portion 61a opposing thereto. Then, the cavity portion 50, which is the lighting space is formed in a space area surrounded by the first base portion 61 and the second base portion 62, and the periphery of the cavity portion 50 provided so as to correspond to the respective light sources 22 are surrounded by the mirror layer 63.

Subsequently, the case body 27 is placed on the circuit board 21 so that the first screw hole 61h of the first flange portion 61c communicates with the first opening hole 21a of the circuit board 21 and the second screw hole 62h of the second flange portion 62c communicates with the second opening hole 21b of the circuit board 21.

Finally, the screw portions of the screws S are passed through the first and second screw holes 61h, 62h and the first and second opening holes 21a, 21b from the front side of the first and second flange portions 61c, 62c, and nuts N are screwed into lower end portions of the screw portions that protrudes toward the back side of the circuit board 21, whereby the circuit board 21 and the case body 27 are overlapped into tight contact with each other and the assembly of the circuit board 21 and the case body 27 is completed.

At this time, since the third notched portion 61g formed into the recessed shape is provided at the lower end portion of the second opposed wall portion 61b, a first gap portion, not illustrated, formed of a substantially rectangular shaped opening window is formed between the circuit board 21 and the second opposed wall portion 61b and, in the same manner, since the sixth notched portion 62g is provided at a lower end portion of the fourth opposed wall portion 62b, a second gap portion, not shown, formed of a substantially rectangular shaped opening window is formed between the circuit board 21 and the fourth opposed wall portion 62b.

After the completion of the assembly of the circuit board 21 and the case body 27, the diffusing member 25 is mounted on the case body 27 (the body portion 60) using a mounting means as needed. At this time, the diffusing member 25 is supported by a surface portion of the first base portion 61 except for the first and second notched portions 61d, 61f and a surface portion of the second base portion 62 except for the fourth, fifth notched portions 62d, 62f.

At this time, since the first notched portion 61d formed into the recessed shape is provided at the upper end portion of the first opposing wall portion 61a, a third gap portion 71 (see FIG. 3) formed of a substantially rectangular shaped opening window is formed between the diffusing member 25 and the first opposing wall portion 61a and, since the second notched portion 61f formed into the recessed shape is provided at the upper end portion of the second opposed wall portion 61b, a fourth gap portion, not shown, formed into a substantially rectangular shaped opening window is formed between the diffusing member 25 and the second opposed wall portion 61b.

Also, since the fourth notched portion 62d formed into the recessed shape is provided at the upper end portion of the third opposed wall portion 62a, a fifth gap portion 72 (see FIG. 3) formed of a substantially rectangular shaped opening window is formed between the diffusing member 25 and the third opposed wall portion 62a and the fifth notched portion 62f formed into the recessed shape is provided at the upper end portion of the fourth opposed wall portion 62b, a sixth gap portion, not shown, formed of a substantially rectangular shaped opening window is formed between the diffusing member 25 and the fourth opposed wall portion 62b.

In this configuration, the illuminating light beams emitted from the respective light sources 22 pass from the lower end side opening 51 of the cavity portion 50 which is the peripheries of the respective light sources 22 through the upper end side opening 52 of the cavity portion 50, and is guided to the diffusing member 25 placed on the case body 27.

At this time, the heat emitted from the respective light sources 22 stays in the vicinity of the lower end side opening 51 which is the peripheries of the light sources 22, then, caused by expansion of air in the vicinity of the lower end side opening 51 where the heat stays, the specific gravity of the air is lowered and hence the heat (the air) moves from the lower end side opening 51 toward the upper end side opening 52, then the heat moved toward the upper end side opening 52 is released to the outside of the case body 27 from the notched portions 61d, 61f, 62d, 62f (that is, the third and fifth gap portions 71, 72 and the fourth and sixth gap portions) as the heat releasing portions formed on the body portion 60 (the case body 27) so as to communicate with the upper end side opening 52 (the cavity portion 50).

Then, when the heat moved toward the upper end side opening 52 in this manner is released to the outside of the case body 27 in this manner, the cavity portion 50 is brought into a negative pressure, and the outside air is introduced into the lower end side opening 51 of the cavity portion 50 via the first and second through hole portions 61e, 62e and the third and sixth notched portions 61g, 62g as the outside air introducing portions.

In other words, in the case of this embodiment, the cavity portion 50 is inhibited from going to a high-temperature state in association with an air circulation in the cavity portion 50 generating in such a manner that the heated air is released from the cavity portion 50 to the outside of the case body 27 through the notched portions 61d, 61f, 62d, 62f as the heat releasing portions, and the outside air is introduced from the outside of the case body 27 into the cavity portion 50 via the first and second through hole portions 61e, 62e and the third and sixth notched portions 61g, 62g as the outside air introducing portion.

Therefore, since the heat generated in association with the light emission of the respective light sources 22 can hardly be transmitted to the case body 27 or the diffusing member 25 positioned in the periphery of the cavity portion 50, deformation of the case body 27 or the diffusing member 25 can be prevented as much as possible. In this manner, by preventing the deformation of the case body 27 or the diffusing member 25, the illuminating light beams emitted from the respective light sources 22 are supplied efficiently toward the liquid crystal display panel 24 in a state in which lighting variations or the like are inhibited, the probability of lowering of the illumination quality of the liquid crystal display panel 24 is eliminated.

Although the illuminating light beams emitted from the respective light sources 22 partly leak to the outside of the case body 27 from the first and second through hole portions 61e, 62e, the third and fifth gap portions 71, 72, the first, second, fourth, and sixth gap portions, since the mirror layer 63 is formed on the inner wall portions of the respective base portions 61, 62, the light beams are guided to the diffusing member 25 while being secured in light amount to some extent.

Then, the diffused outgoing light going out from the diffusing member 25 passes through the lens member 26, and goes out from the lens member 26 as the parallel outgoing light. The liquid crystal display panel 24 is lighted by the parallel outgoing light going out from the lens member 26 therethrough, whereby the display light beam L is emitted from the liquid crystal display panel 24. The display light beam L emitted from the liquid crystal display panel 24 passes through the opening portion 28a of the housing 28 and guided toward the reflector 30.

The reflector 30 includes a concave mirror (reflecting member) 31 configured to reflect the display light beam L emitted from the liquid crystal display panel 24, and a mirror holder (holding member) 32 formed of a synthetic resin configured to hold the concave mirror 31.

The concave mirror 31 is formed by depositing a reflecting layer 31a on the resin substrate formed of polycarbonate having a depressed surface. The concave mirror 31 in this configuration is disposed in an inclined state at a position where the reflecting layer 31a thereof opposes the liquid crystal display panel 24 and the translucent cover, described later, of the housing 40 and can be approached from the translucent cover.

The concave mirror 31 is configured to reflect the display light L from display 20 toward the side of the translucent cover (the front glass 13 of the vehicle 10) while enlarging the scale thereof. This means that the concave mirror 31 enlarges the display light L emitted from the display 20 and projects the enlarged display light L to the front glass 13 via the translucent cover. The concave mirror 31 is adhered to the mirror holder 32 with a double-face adhesive tape.

The housing 40 is formed of a black light-shielding synthetic resin material, is formed into a substantially box shape, is configured to hold and accommodate the display 20 and the reflector 30 in the space portion 41 as the internal space thereof, and includes an opening window 42 opening on an upper portion (the front glass 13 side) of the concave mirror 31 of the reflector 30.

Also, disposed in the housing 40 is a translucent cover 43 as a light-output portion so as to close the opening window 42. The translucent cover 43 as described above is formed of translucent synthetic resin material (for example, acrylic resin), and has a function as the light-translucent member which allows transmission (passage) of the display light L reflected by the concave mirror 31. In other words, the display light beam L reflected by the concave mirror 31 is projected on the front glass 13 through the translucent cover 43 formed on the housing 40, whereby the driver 14 views the virtual image V obtained by this projection.

As described above, in this embodiment, in a lighting device including a light source unit 23 having the respective light sources 22 disposed on the circuit board 21, the liquid crystal display panel 24 arranged on the front side of the light source unit 23 and lighted by the illuminating light beams from the light sources 22, the case body 27 arranged between the circuit board 21 and the liquid crystal display panel 24 and includes the cavity portion 50 provided so as to correspond to the respective light sources 22, and the diffusing member 25 as a placed member positioned between the case body 27 and the liquid crystal display panel 24 and is placed on the case body 27, wherein the circuit board 21 is disposed so as to close the lower end side opening 51 of the cavity portion 50 and the diffusing member 25 is disposed so as to close the upper end side opening 52 of the cavity portion 50 on the side opposite from the lower end side opening 51, the case body 27 is formed with heat releasing portions 61d, 61f, 62d, 62f for releasing heat generated by the respective light sources 22 to the outside of the case body 27.

Therefore, the heat emitted from the respective light sources 22 is released to the outside of the case body 27 from the cavity portion 50 through the first, second, fourth and fifth notched portions 61d, 61f, 62d, 62f (that is, the third and fifth gap portions 71, 72 and the fourth and sixth gap portions) as heat releasing portions provided so as to communicate with the upper end side opening 52 as described above, the deformation of the case body 27 or the diffusing member 25 due to the heat generated when the respective light sources 22 emit light beams. In this manner, by preventing the deformation of the case body 27 or the diffusing member 25, the illuminating light beams emitted from the respective light sources 22 are supplied efficiently toward the liquid crystal display panel 24 in a state in which lighting variations or the like are inhibited, the probability of lowering of the illumination quality of the liquid crystal display panel 24 is eliminated.

Also, in this embodiment, an example in which the cavity portion 50 as the lighting space is formed by the circuit board 21, the diffusing member 25, and the case body 27 (the body portion 60) has been described. For example, however, a configuration in which the diffusing member 25 and the lens member 26 are eliminated and the liquid crystal display panel 24 is placed on the case body 27, and the cavity portion 50 as the lighting space is formed by the circuit board 21, the liquid crystal display panel 24, and the case body 27 (the body portion 60) is also applicable. In other words, in this case, the liquid crystal display panel 24 is configured to be placed (disposed) on the case body 27 so as to close the upper end side opening 52 of the cavity portion 50 on the side opposite from the lower end side opening 51.

Also, in this embodiment, an example in which the heat generated by the light sources 22 is released from the cavity portion 50 to the outside of the case body 27 using the four notched portions 61d, 61f, 62d, 62f formed on the body portion 60 by notching has been described. For example, however, a configuration in which the four notched portions 61d, 61f, 62d, 62f are eliminated and heat generated by the light sources 22 is released to the outside of the case body 27 from the cavity portion 50 using four through holes formed so as to open at predetermined positions (for example, at a substantially center area or an upper side with respect to the substantially center area) is also applicable. For reference, the number of notches for releasing the heat (or the through hole portions) is arbitrary, and the notches for releasing the heat and the through hole portions may be mixed.

Also, in this embodiment, an example in which the outside air is taken from the outside of the case body 27 into the lower end side opening 51 (the cavity portion 50) using the first and second through hole portions 61e, 62e and the third and sixth notched portions 61g, 62g as the outside air introducing portions has been described. However, a configuration in which the first and second through hole portions 61e, 62e and the third and sixth notched portions 61g, 62g are eliminated and four through holes penetrating through the panel thickness of the respective opposing wall portions 61a, 61b, 62a, 62b are provided on predetermined positions of the respective opposing wall portions 61a, 61b, 62a, 62b (for example, at the substantially center area or a lower side with respect to the substantially center area), and the outside air is taken from the outside of the case body 27 into the cavity portion 50 using these through holes is also applicable. For reference, the number of through hole portions and notched portions for introducing outside air (or the through hole for introducing outside air) is arbitrary, and through hole portions and notched portions for introducing outside air and the through holes may be mixed.

Also, in this embodiment, an example in which the outside air is taken from the outside of the case body 27 into the lower end side opening 51 using the first and second through hole portions 61e, 62e and the third and sixth notched portions 61g, 62g as the outside air introducing portions has been described. For example, however, a configuration in which the first and second through hole portions 61e, 62e and the third and sixth notched portions 61g, 62g are eliminated and the first, second, fourth and fifth notched portions 61d, 61f, 62d, 62f function as the heat releasing portion and the outside air introducing portion is also applicable.

Figure 5:
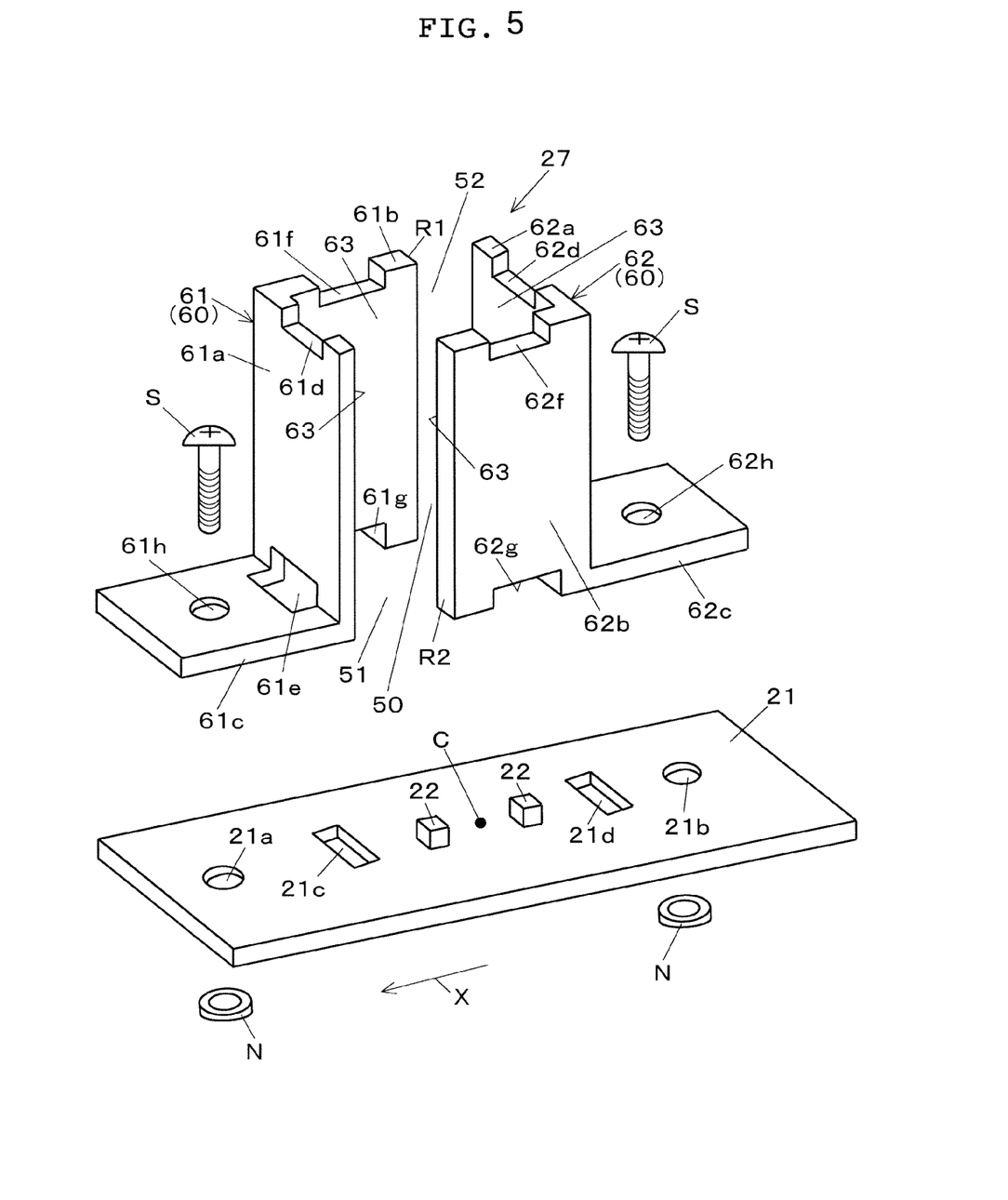
FIG. 5 is a perspective view showing a case body and a substrate according to a modification of the same embodiment.

Also, in this embodiment, an example in which the first through hole portion 61e is provided at the boundary portion between the first opposing wall portion 61a and the first flange portion 61c of the first base portion 61, and the second through hole portion 62e is provided at the boundary portion between the third opposed wall portion 62a and the second flange portion 62c of the second base portion 62 have been described. For example, however, as a modification of this embodiment, a configuration in which the first hole portion 21c formed of a substantially rectangular-shaped through hole communicating with the first through hole portion 61e and the second hole portion 21d formed of a substantially rectangular-shaped through hole communicating with the second through hole portion 62e are provided on the circuit board 21 as shown in FIG. 5, and the outside air existing around the case body 27 is taken into the cavity portion 50 through the respective through hole portions 61e, 62e and the air existing on the back of the circuit board 21 is taken into the cavity portion 50 through the respective hole portions 21c, 21d and the through hole portions 61e, 62e is also applicable.

Also, in this embodiment, an example in which the two light sources 22 are provided (mounted) on the wiring pattern of the circuit board 21 has been described. For example, however, it is preferable to provide the wiring pattern on the circuit board 21 so as to circumvent a position where the circuit board 21 and the case body 27 are in abutment as shown in FIG. 6 as another modification of this embodiment.

Figure 6:
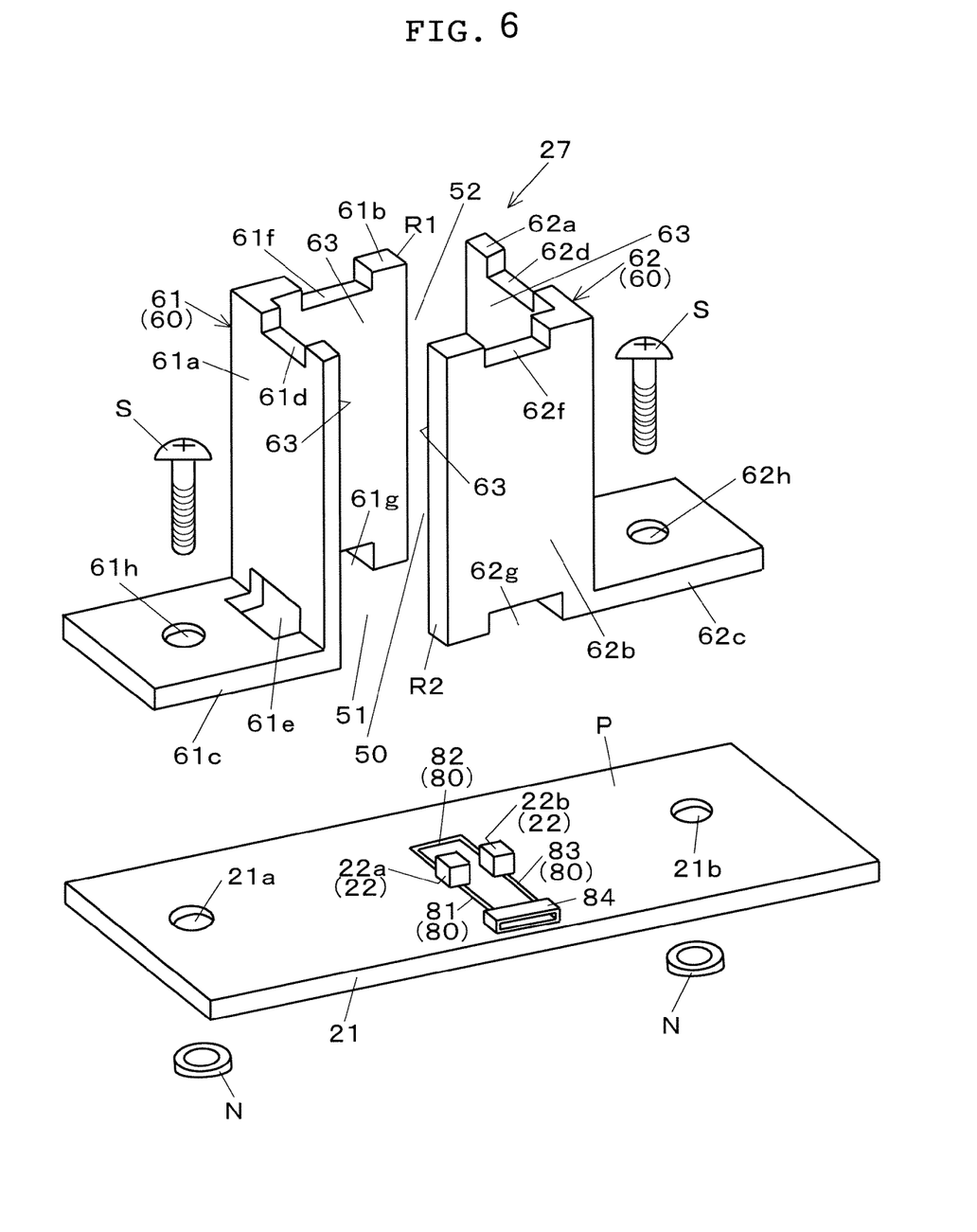
FIG. 6 is a perspective view showing a case body and a substrate according to another modification of the same embodiment.

More specifically, as shown in FIG. 6, the surface portion P of the circuit board 21 is provided with the wiring pattern 80 for supplying lighting power to the two light sources 22, and the wiring pattern 80 includes a first wiring portion 81, a second wiring portion 82, and a third wiring portion 83.

The first wiring portion 81 is formed of a linear electrically conducting path for conductively connecting a first terminal portion (not shown) of the first connector 84 mounted on the circuit board 21 and one of a pair of power feeding terminals, not shown, (the power feeding terminal positioned on the lower side of the first light source 22a in FIG. 6) provided on the light source 22 located on the left side in FIG. 6 (hereinafter, referred to as first light source 22a).

The second wiring portion 82 is formed of a substantially angular U-shaped electrically-conducting path for conductively connecting the other power feeding terminal (not shown) of the first light source 22a located on the side opposite from the one power feeding terminal of the first light source 22a and one of the pair of power feeding terminals, not shown, (the power feeding terminal positioned on the upper side of the second light source 22b in FIG. 6) provided on the power source 22 located on the right side in FIG. 6 (hereinafter, referred to as the second light source 22b).

Also the third wiring portion 83 is formed of a linear electrically-conducting path for conductively connecting the other power feeding terminal (not shown) of the second light source 22b located on the side opposite from the one power feeding terminal of the second light source 22b and the lower side of the second light source 22b and the second terminal portion (not shown) of the first connector 84.

Then, in this case, although detailed illustration is omitted, the second connector provided on a main substrate having a micro computer configured to control the drive circuit configured to drive the liquid crystal, a light source drive circuit configured to drive the respective light sources 22a, 22b, control means including a microcomputer configured to control the drive circuit and the light source drive circuit mounted in a predetermined circuit pattern and the first connector 84 are electrically connected via a wiring member such as an electric cord or the like. The second connector is mounted on the circuit pattern, as a matter of course.

Therefore, the light source drive circuit is conductively connected to the first and second light sources 22a, 22b via the circuit pattern, the second connector, the wiring member, the first connector 84, and the wiring pattern 80. Then, when the control means issues a command signal for lighting the respective light sources 22a, 22b to the light source drive circuit, the light source drive circuit receives the command signal, and lights the respective light sources 22a, 22b. In other words, at this time, a lighting power is supplied from the light source drive circuit to the respective light sources 22a, 22b via the circuit pattern, the second connector, the wiring member, the first connector 84 and the wiring pattern 80, so that the respective light sources 22a, 22b light (emit light beams).

In the configuration shown in FIG. 6, when the case body 27 is placed on the circuit board 21 so that the circuit board 21 and the case body 27 come into abutment with each other, the wiring pattern 80 is provided so as to circumvent the portion where the circuit board 21 and the case body 27 are in abutment.

More specifically, the first and third wiring portions 81, 83 of the wiring pattern 80 are provided respectively at a surface portion of the circuit board 21 corresponding to the cavity portion 50 as the lighting space (the inner space of the body portion 60), a surface portion of the circuit board 21 corresponding to the sixth notched portion 62g formed on the lower end side of the case body 27 (the fourth opposed wall portion 62b), and a surface portion of the circuit board 21 between the outer wall surface of the fourth opposed wall portion 62b and the first connector 84, the circuit board 21 and the case body 27, and hence do not exist at all at the portion where the circuit board 21 and the case body 27 are in abutment as a consequence. Also, the second wiring portion 82 of the wiring pattern 80 is provided on the surface portion of the circuit board 21 corresponding to the cavity portion 50, and hence does not exist at all at the portion where the circuit board 21 and the case body 27 are in abutment as a consequence.

Incidentally, in the configuration in FIG. 6, when the case body 27 which is not formed with the sixth notched portion 62g is placed on the circuit board 21, part of the wiring pattern 80 (the first and third wiring portions 81, 83) provided on the circuit board 21 comes to the position where the circuit board 21 and the case body 27 (the fourth opposed wall portion 62b) are in abutment. Here, since the wiring pattern 80 is formed on the surface portion (flat portion) P of the circuit board 21 so as to have a minute thickness, a minute level difference appears at a boundary between the wiring pattern 80 and the surface portion P of the circuit board 21.

Then, assuming that all the lower end surfaces of the four opposing wall portions 61a, 61b, 62a, 62b of the case body 27 are flat surfaces, the first, second and third opposed wall portions 61a, 61b, 62a and the surface portion P of the circuit board 21 are completely brought into tight contact with each other when the case body 27 is placed (fixed) onto the circuit board 21. However, the fourth opposed wall portion 62b and the surface portion P do not completely come into tight contact with each other because of the level difference described above. Accordingly, the case body 27 is placed on the circuit board 21 so as to incline slightly instead of upright position, which may affect adversely to the lighting efficiency of the illuminating light beams from the respective light sources 22a, 22b to the diffusing member 25.

In contrast, in another modification of the embodiment described above, since the wiring pattern 80 is provided on the surface of the circuit board 21 so as to circumvent the position where the circuit board 21 and the case body 27 come into abutment, the lower end surfaces of the four opposing wall portions 61a, 61b, 62a, 62b which are flat shape and the surface portion (flat portion) of the circuit board 21 come into contact with each other, so that the case body 27 can be placed (fixed) onto the circuit board 21 so that the case body 27 is positioned in an upright posture. Therefore, in the another modification, deformation of the case body 27 or the like by the heat generated when the respective first and second light sources 22a, 22b emit light beams can be prevented as much as possible and, in addition, since the case body 27 is arranged on the circuit board 21 so as to be brought into the upright posture, the probability of affecting the illumination efficiency of the illuminating light beams proceeding from the respective light sources 22a, 22b to the diffusing member 25 adversely is eliminated.

In the another modification, the shapes of the respective wiring portions 81, 82, 83 of the wiring pattern 80 can be set freely as long as the shape where the circuit board 21 and the case body 27 come into abutment is circumvented.

Although an example in which the two light sources 22 are mounted on the circuit board 21 has been described in this embodiment, the number of light sources 22 mounted on the circuit board 21 may be one, or three or more.

In this embodiment, although an example in which the display light beam L going out from the liquid crystal display panel 24 is projected on the front glass 13 has been described, for example, a combiner film for reflecting the display light beam L desirably toward the driver 14 may be provided on the front glass 13, or the display light beam L may be projected on a specific reflecting body separate from the front glass 13.

INDUSTRIAL APPLICABILITY

The present invention is applicable to a lighting device including a light source unit having the light source mounted on a substrate and a illuminated member such as a liquid crystal panel or the like transmitted and lighted by the illuminating light beams from the light source therethrough.

DESCRIPTION OF REFERENCE NUMERALS AND SIGNS 20 display (lighting device)
21 circuit board (substrate)
21c first hole portion
21d second hole portion
22 light source
23 light source unit
24 liquid crystal display panel (lighted member)
25 diffusing member (placed member)
27 case body
50 cavity portion
51 lower end side opening
52 upper end side opening
60 body portion
61 first base portion
61a first opposing wall portion
61b second opposed wall portion
61d first notched portion (heat releasing portion)
61e first through hole portion (outside air introducing portion)
61f second notched portion (heat releasing portion)
61g third notched portion (outside air introducing portion)
62 second base portion
62a third opposed wall portion
62b fourth opposed wall portion
62d fourth notched portion (heat releasing portion)
62e second through hole portion (outside air introducing portion)
62f fifth notched portion (heat releasing portion)
62g sixth notched portion (outside air introducing portion)
63 mirror layer
80 wiring pattern
81 first wiring portion
82 second wiring portion
83 third wiring portion

The invention claimed is:

1. A lighting device comprising:
a light source unit having a light source disposed on a substrate;
a lighted member arranged on the front side of the light source unit and lighted by an illuminating light beam from the light source; and
a case member arranged between the substrate and the lighted member and includes a cavity portion provided so as to correspond to the light source,
wherein the substrate is disposed so as to close an opening on a lower end side of the cavity portion and the lighted member is disposed so as to close an opening on an upper end side of the cavity portion on the side opposite from the lower end side opening, and
a notched portion is notched at a top edge of the end side of the case member,
the notched portion can release heat generated by a light source to the outside of the case member, and
a gap portion exists between the lighted member and a top edge of the end side of the case member.

2. A lighting device comprising:
a light source unit having a light source disposed on a substrate;
a lighted member arranged on the front side of the light source unit and lighted by an illuminating light beam from the light source;
a case member arranged between the substrate and the lighted member and includes a cavity portion provided so as to correspond to the light source; and
a diffusing member positioned between the case member and the lighted member and placed on the case member,
wherein the substrate is disposed so as to close an opening on a lower end side of the cavity portion and the diffusing member is disposed so as to close an opening on an upper end side of the cavity portion on the side opposite from the lower end side opening, and
a notched portion is notched at a top edge of the end side of the case member, the notched portion can release heat generated by a light source to the outside of the case member, and a gap portion exists between the diffusing member and a top edge of the end side of the case member.

3. The lighting device according to claim 1, wherein the substrate is provided with a wiring pattern configured to supply lighting power to the light source, and the wiring pattern is provided on the substrate so as to circumvent a portion where the substrate and the case member come into abutment.

4. The lighting device according to claim 2, wherein the substrate is provided with a wiring pattern configured to supply lighting power to the light source, and the wiring pattern is provided on the substrate so as to circumvent a portion where the substrate and the case member come into abutment.

* * * * *